United States Patent
Neukom (10) Patent No.: US 7,973,841 B2
(45) Date of Patent: Jul. 5, 2011

(54) PHOTO SENSOR WITH A LOW-NOISE PHOTO ELEMENT, SUB-LINEAR RESPONSE AND GLOBAL SHUTTER

(75) Inventor: Simon Neukom, Uster (CH)

(73) Assignee: CSEM Centre Suisse d'Electronique et de Microtechnique SA - Recherche et Développment, Neuchatel (CH)

( * ) Notice: Subject to any disclaimer, the term of this patent is extended or adjusted under 35 U.S.C. 154(b) by 390 days.

(21) Appl. No.: 12/250,997

(22) Filed: Oct. 14, 2008

(65) Prior Publication Data

US 2009/0095986 A1   Apr. 16, 2009

Related U.S. Application Data

(60) Provisional application No. 60/960,781, filed on Oct. 15, 2007.

(51) Int. Cl.
  *H04N 3/14* (2006.01)
  *H04N 5/335* (2011.01)
  *H01L 31/062* (2006.01)
  *H01L 31/113* (2006.01)

(52) U.S. Cl. .............. 348/294; 250/208.1; 257/291; 257/292

(58) Field of Classification Search .......... 348/294–324; 250/208.1; 257/225, 291, 292
See application file for complete search history.

(56) References Cited

U.S. PATENT DOCUMENTS

| | | | |
|---|---|---|---|
| 6,815,685 B2 | 11/2004 | Wany | |
| 7,170,041 B2 * | 1/2007 | Rahn | 250/208.1 |
| 7,235,772 B2 * | 6/2007 | Ko et al. | 250/208.1 |
| 7,683,954 B2 * | 3/2010 | Ichikawa et al. | 348/308 |
| 2005/0092894 A1 * | 5/2005 | Fossum | 250/208.1 |
| 2006/0219868 A1 * | 10/2006 | Morimoto et al. | 250/208.1 |
| 2006/0255380 A1 * | 11/2006 | Lee | 257/291 |
| 2008/0173909 A1 * | 7/2008 | Parks | 257/292 |
| 2008/0224186 A1 * | 9/2008 | Ellis-Monaghan et al. | 257/292 |

FOREIGN PATENT DOCUMENTS

WO   WO2007115415   10/2007

\* cited by examiner

*Primary Examiner* — Nhan T Tran
*Assistant Examiner* — Tuan H Le
(74) *Attorney, Agent, or Firm* — Weingarten, Schurgin, Gagnebin & Lebovici LLP (57) ABSTRACT

A photo sensor exhibiting low noise, low smear, low dark current, high dynamic range and global shutter functionality consists either of a pinned (or buried) photodiode or a photosensitive charge-coupled device, each with associated transfer gate, a sub-linear element, a shutter transistor, a reset circuit and a read-out circuit. Using two output paths global shutter and high speed operation are possible for the linear and the sub-linear output of the sensor. Because of its compact size, the photo sensor can be employed in one- and two-dimensional image sensors, fabricated with industry-standard CMOS and CCD technologies.

11 Claims, 8 Drawing Sheets

PHOTO SENSOR WITH A LOW-NOISE PHOTO ELEMENT, SUB-LINEAR RESPONSE AND GLOBAL SHUTTER

This application claims priority to U.S. Provisional Application No. 60/960,781, filed Oct. 15, 2007.

FIELD OF THE INVENTION

The present invention relates to imaging devices and more specifically, to imaging devices that are based on solid-state photo sensors.

LIST OF ABBREVIATIONS

VSS=ground voltage
PPD=pinned photodiode
CCD=charge-coupled device
ST=pinned photodiode storage node
TG=transfer gate
VRST=reset voltage
VPIN=pinned photodiode potential
VTX=charge transfer voltage on TG
VSP=spill-over voltage on TG
VSL=sub-linear element voltage
VPRS1=pixel reset voltage 1
VPSL=pixel's sub-linear signal voltage
VPRS2=pixel reset voltage 2
VPLI=pixel's linear signal voltage
FD=floating diffusion
RS=reset signal for FD or SN
SH=shutter signal
SS=sampling signal
SN=sense node
SEL=pixel select signal

BACKGROUND OF THE INVENTION

Conventional photodiodes as employed in complimentary metal-oxide semi-conductor (CMOS) image sensors suffer from a set of practical limitations such as elevated dark current densities that can be overcome by the use of a pinned (or buried photodiode (PPD). Unfortunately, the advantage of the PPD regarding low dark current is obtained at the expense of a limited dynamic range of typically less than 80 dB. In conventional photodiode pixels, these limitations of the dynamic range can be overcome with the use of a sub-linear device connected the cathode of the photodiode, as taught for example in U.S. Pat. No. 6,815,685 (M. Wäny et al., "Photodetector and method for detecting radiation"). However this solution cannot be adopted for PPDs and charge-coupled devices (CCDs) because the storage node (ST) is internal to the device. By setting the voltage of the transfer gate (TG) to a well defined voltage to allow flowing excess charge into the floating diffusion (FD), a sub-linear element connected to FD generates a voltage on said node that is a sub-linear measure of the photo current.

International patent application WO2007/115415 (Seitz et. al, "Photo sensor with pinned photodiode and sub-linear response") discloses a photo sensor exhibiting low noise, low smear, low dark current and high dynamic range that consists of a pinned (or buried) photodiode (PPD) with associated transfer gate (TG), a reset circuit and a device (SL) with sub-linear voltage-to-current characteristic. The storage node (Se) is external to the device.

DESCRIPTION OF THE FIGURES

The invention will be better understood and objects other than those set forth above will become apparent when consideration is given to the following detailed description thereof. Such description makes reference to the annexed drawings, wherein:

FIG. 1 schematically shows a pixel that allows global shutter and integrate-while-read, using two output channels for maximum speed, according to an embodiment of the invention;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical or analog elements but may not be referenced in the description for all figures.

MODES FOR CARRYING OUT THE INVENTION

It should be noted that terms such as "first transistor", "second transistor" etc. are respectively referenced in the accompanying figures as M1, M2, etc.

It should be understood that an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions.

It should be understood that the phraseology and terminology employed herein is not to be construed as limiting and is for descriptive purpose only.

The principles and uses of the teachings of the present invention may be better understood with reference to the accompanying description, figures and examples.

It should be understood that the details set forth herein do not construe a limitation to an application of the invention. Furthermore, it should be understood that the invention can be carried out or practiced in various ways and that the invention can be implemented in embodiments other than the ones outlined in the description below.

It should be understood that the terms "including", "comprising", "consisting" and grammatical variants thereof do not preclude the addition of one or more components, features, steps, integers or groups thereof.

The meaning of "in" includes "in" and "on". The term "based on" is not exclusive and provides for being based on additional factors not described, unless other-wise indicated.

If the specification or claims refer to "an additional" element, that does not preclude there being more than one of the additional element.

It should be understood that where the claims or specification refer to "a" or "an" element, such reference is not to be construed as there being only one of that element.

It should be understood that where the specification states that a component, feature, structure, or characteristic "may", "might", "can" or "could" be included, that particular component, feature, structure, or characteristic is not required to be included.

The term "method" and "process" refers to manners, means, techniques and procedures for accomplishing a given task including, but is not limited to those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein ought to be commonly understood as by one of ordinary skill in the art to which the invention belongs, unless otherwise defined.

The present invention can be implemented in the testing or practice with methods and materials equivalent or similar to those described herein.

In many solid-state imaging applications it may be desirable to employ a photo sensor having a global shutter functionality combined with low-noise and high dynamic range.

Embodiments of the present invention enable for example the implementation of low-noise, low-smear, low-dark-current, one-dimensional and two-dimensional image sensing, where it is necessary to increase the dynamic range while having a global shutter functionality at the same time.

In particular, the invention relates in embodiments to a photo sensor for generating photoinduced charge carriers, wherein the photo sensor is implemented by one of the following: a pinned photo diode (PPD), a buried photo diode, and a charge-coupled device (CCD).

In embodiments, the photo sensor comprises at least one transfer gate to release the charge into at least one respective floating diffusion node, a sub-linear element connected to the at least one floating diffusion node, a sub-linear voltage source for which the voltage drop depends in a sub-linear fashion on a current through photo sensor, and a first transistor connected between the floating diffusion and a sense node, and a second transistor between the sense node and the reset voltage, a third transistor, a fourth transistor, a source follower and a select transistor for measuring a measured voltage indicative of a voltage at the floating diffusion node, a control circuitry adapted to run at least one measuring cycle.

In embodiments, each measuring cycle comprises the following three phases: a) in a first phase the control circuit issues a first reset command to the second transistor and toggles a shutter signal high, and transfer gate between a spill-over voltage and a charge transfer voltage to completely empty the pinned photodiode storage node of the PPD; b) in a second phase a select signal of a pixel is controlled to measure a pixel's first reset voltage, then puts the shutter signal high to measure the pixel's sub-linear signal voltage, and issues a second reset command based on the measurement, and c) in a third phase the control circuit controls the pixel select signal to measure the pixel's second reset voltage, then puts the shutter signal high and operates the transfer gate to generate the pixel's fourth linear signal voltage.

In embodiments, the first transistor is a shutter transistor.

In embodiments, the photo sensor further comprises a first sub-linear reset element connected between first floating diffusion node, the sub-linear voltage source and the first reset voltage, for which a voltage drop depend in a sub-linear fashion on a current through the photo sensor, and a second sub-linear reset element connected between a second floating diffusion node, a VSS and a second reset voltage.

In embodiments, the second sub-linear reset element is a reset transistor.

In embodiments, the photo sensor further comprises a fifth transistor, wherein the second and third transistor measures a first voltage on the first floating diffusion node, and the fourth and the fifth transistor measure a second voltage on the second floating diffusion node.

In embodiments, the photo sensor further comprises a sixth, seventh and eighth transistor, wherein both the seventh and eighth transistor are operatively coupled between the second floating diffusion node and the sense node, wherein the second transistor is operatively coupled with the first floating diffusion node and the sense node, wherein the fourth transistor is operatively coupled with the reset voltage and the sense node, thus enabling the source follower and the select transistor to measure a measured the voltage at the sense node.

In embodiments, the photo sensor further comprises a ninth transistor between the second floating diffusion node, a tenth transistor, an eleventh transistor, an twelfth transistor, a first sense node, a second sense node, wherein the third transistor is operatively coupled between the first floating diffusion node and the first sense node, wherein the eighth and the ninth transistor are between the second floating diffusion node and the second sense node, wherein the fourth transistor is operatively coupled between the first sense node and a third reset voltage, wherein the tenth transistor is operatively coupled between the second sense node and a fourth reset voltage respectively, wherein the fifth and sixth transistors measure a voltage indicative of a voltage at the first sense node, and wherein an eleventh and twelfth transistor measure a voltage at the second sense node.

In embodiments, the photo sensor comprises a third transfer gate between a pinned photodiode storage node and fifth reset voltage.

In embodiments, the sub-linear element is either one of the following: a diode and a diode connected transistor.

In embodiment, the sub-linear reset element comprises either one of the following:
  1 a sub-linear element and a reset transistor wherein the gate voltage has two different values, 0 and VDD; and
  2 a transistor wherein the gate voltage can have three state: 0, VDD and said sub-linear voltage source.

In embodiments, the photo sensor may be implemented in CMOS-CCD hybrid image sensors whose photosensitive devices employ charge-coupled devices (CCD), In embodiments of the invention it may be desirable to provide a photo sensor offering the advantages of a PPD or CCD combined with a sub-linear device, but also a global shutter functionality and means to enable high speed operation.

A further object of the invention is to provide methods allowing integrate-while-read, a feature that is very often used in high speed imaging.

Accordingly, in addition to the PPD or CCD phototransistor, the sensor comprises two transfer gates (T1 and T2) connecting the photo active element to two nodes FD1 and FD2, as is schematically illustrated in FIG. 1. At least FD1 comprises a sub-linear element. Both nodes have independent reset transistors associated. FD1 is connected to node SN1 via two transistors (M2 and M3) in series. SN1 has another reset transistor M4 and a read-out structure (M5 and M6) connected. M6 connects to an output VLOG. From node FD2 a second signal path leads to an output VLIN. The parallel structure from the photo-active element to outputs VLIN and VLOG enables high speed operation. The reset transistors on the nodes FD1, FD2, SN1 and SN2 allow integrate-while-read. The series connection of M2 and M3 allows storing the signal from the sensor without immediate read-out. The same holds true for M8 and M9. Many photo sensors working in parallel can therefore be read-out sequentially and at the same time integrate the next signal on the photo-active element. In particular, the device can be operated in the following phases which may be part of repetitive measurement cycles:

1. Initial reset: all internal nodes are reset by activating RS1 to RS4.
2. Exposure: accumulate charges on the photo-active element, set the transfer gate (TG1) voltage to the spill-over potential (VSP).
3. Global shutter for sub-linear part: SH1 saves the sub-linear part on FD1 to the intermediate node between M2 and M3
4. Global shutter for linear part: TG2 and SH2 are activated to save the linear part to the intermediate node between M8 and M9
5. Global reset: FD1 and FD2 are reset by activating RS1 and RS2. The pixel is then ready for the next exposure.
6. Line by line read-out: SELL and SEL2 are activated and the column amplifiers can store the reset values of SN1 and SN2. Then SS1 and SS2 transfer the signals to SN1 and SN2. The column amplifiers can then sample the signals again and calculate the differences VRST1-VLOG and VRST2-VLIN.

The photo sensor has the potential to offer, at the same time, low noise, low image lag and smear, low dark current, a high dynamic range, a global shutter and high speed operation capabilities.

As outlined in association with the figures, it is assumed that all MOS transistors are of type NMOS. The invention however is not limit to the use of NMOS transistors. Also PMOS transistors or any combination of both types can be used to implement the pixels.

Figure 7:
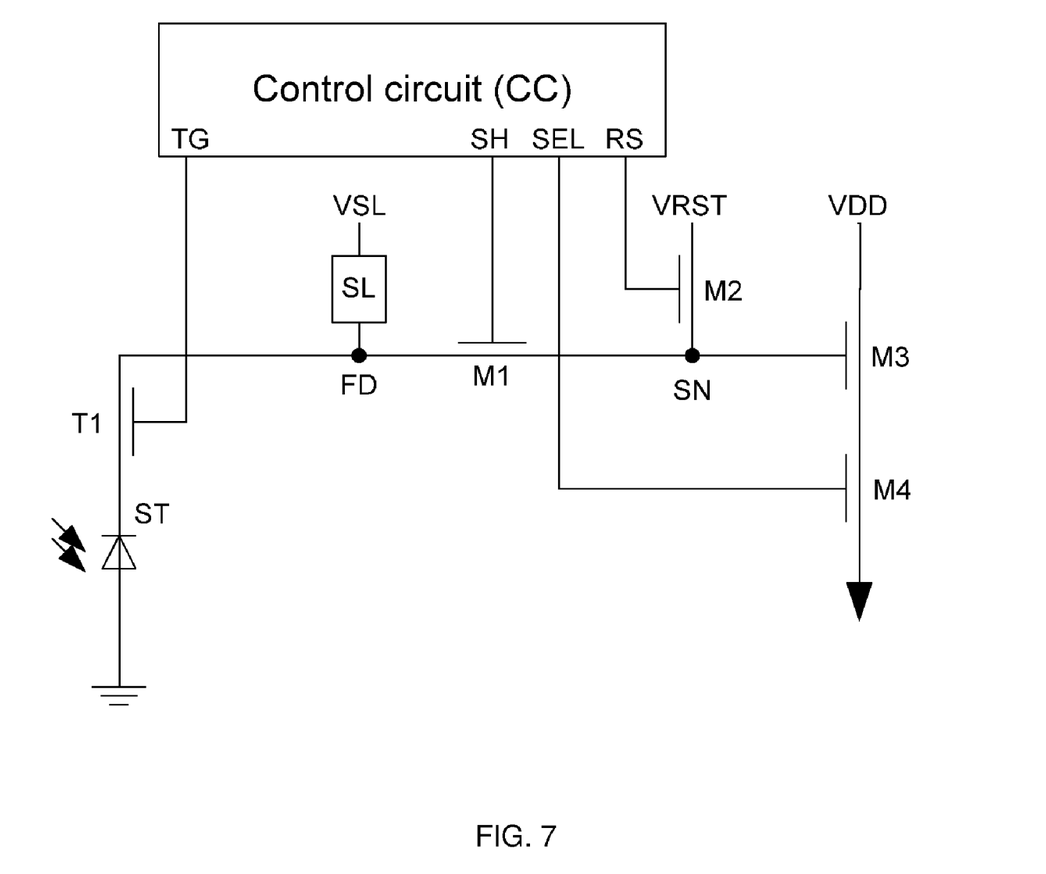
Figure 8:
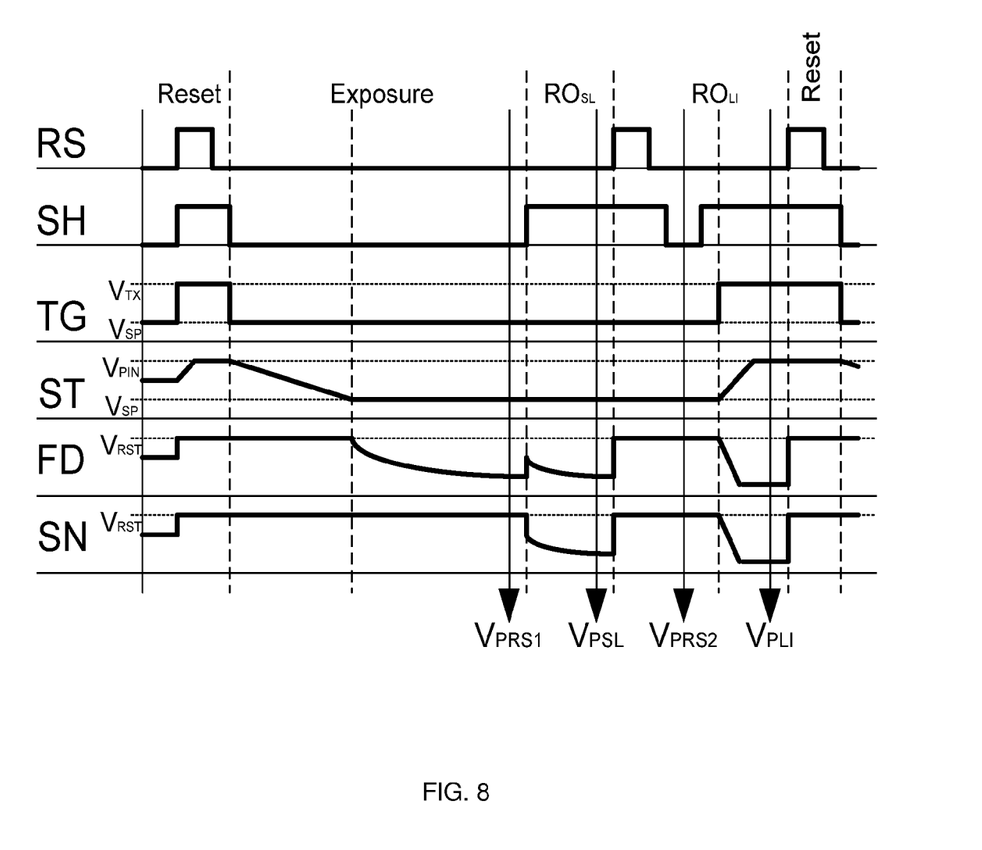
FIG. 8 shows a voltage diagram for large illumination levels.

The basic operation mode is illustrated with the pixel with reference to FIG. 7 and FIG. 8.

The exposure cycle is started by reverse biasing the PPD to its pinning potential and by setting the transfer gate (TG) to a non-zero skimming potential (VSP). Photo-generated charge carriers start to fill the PPD; if illumination intensity is high, excessive photo charges are flowing over the transfer gate (T1) to the floating diffusion node (FD). The sub-linear element generates a voltage on FD that is a sub-linear function of the illumination, hence increasing the dynamic range. The voltage at the sense node (SN) is read 4 times, namely at the end of the exposure time, after M1 transferred the sub-linear voltage level from FD to SN, after reset and after the photo charge in the buried channel has been transferred via FD to SN. This allows correlated multiple sampling techniques for eliminating reset noise.

The following operation phases can be identified:

Reset of pixel: FD and SN are reset to VRST if SH and RS are both high. By pulling TG high as well, also the PPD is reset: the storage node is empty and settles at VPIN.

Exposure: as soon as RS, SH and TG go low, integration of photo generated charges starts: the potential on ST drops as more and more charges are accumulated up to the level VSP. Now charges spill-over into FD. This current generates a voltage drop over the sub-linear element.

Read-out of sub-linear part: the sub-linear part is read-out by activating SEL. The reset value VPRS1 is available at the output of the pixel. As soon as the column amplifier sampled the value SH is put high to transfer the sub-linear part of the signal (if any) from FD to SN and further to the output of the pixel. The column amplifier samples VPSL.

Read-out of linear part RS is again toggled low-high-low and SH is put low. The second reset value VPRS2 can be stored in the column amplifier. Afterwards SH and TG go high to transfer the linear part from the PPD to FD, SN and the output of the pixel. The column amplifier can calculate the difference between VPRS2 and VPLI. This scheme allows correlated double sampling of the linear part.

FIG. 8 shows the case of large illumination levels, where the sub-linear element is activated by the charges spilling over T1. Consequently the linear part of the signal is equal to the full-well level of the PPD and does not have to be further processed.

At low illumination levels the spill-over limit is not reached and all charges are hold on ST. For this case the sub-linear part of the signals is zero (FD does not drop during the exposure time) and only a linear part exists.

Although the pixel outputs two values, only one holds the information about the illumination. Simple circuitry can be used to determine which of the two levels should be further processed in an imager implementing the pixels as described in this invention.

Figure 2:
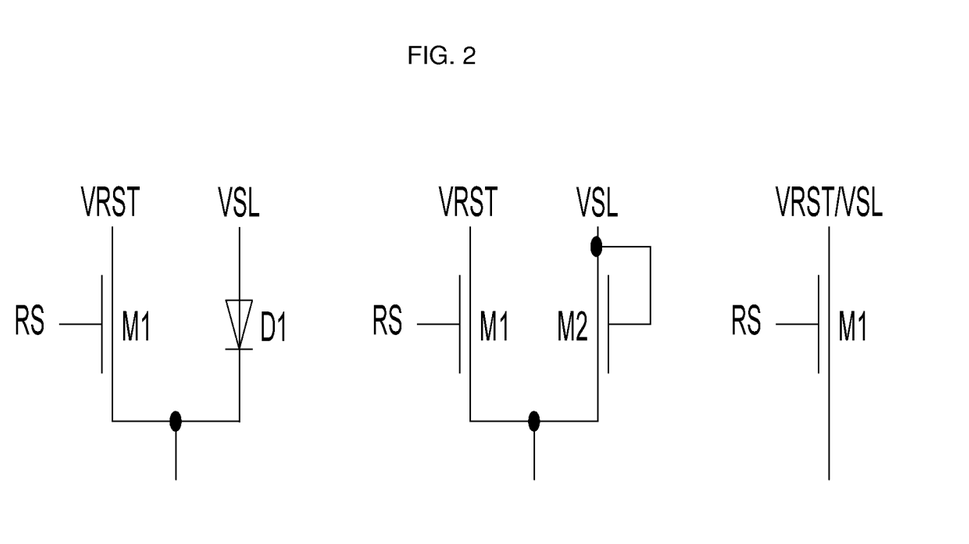
FIG. 2 schematically depicts 3 different possibilities of combining the reset transistor and the sub-linear element, according to some embodiments of the invention.
Figure 6:
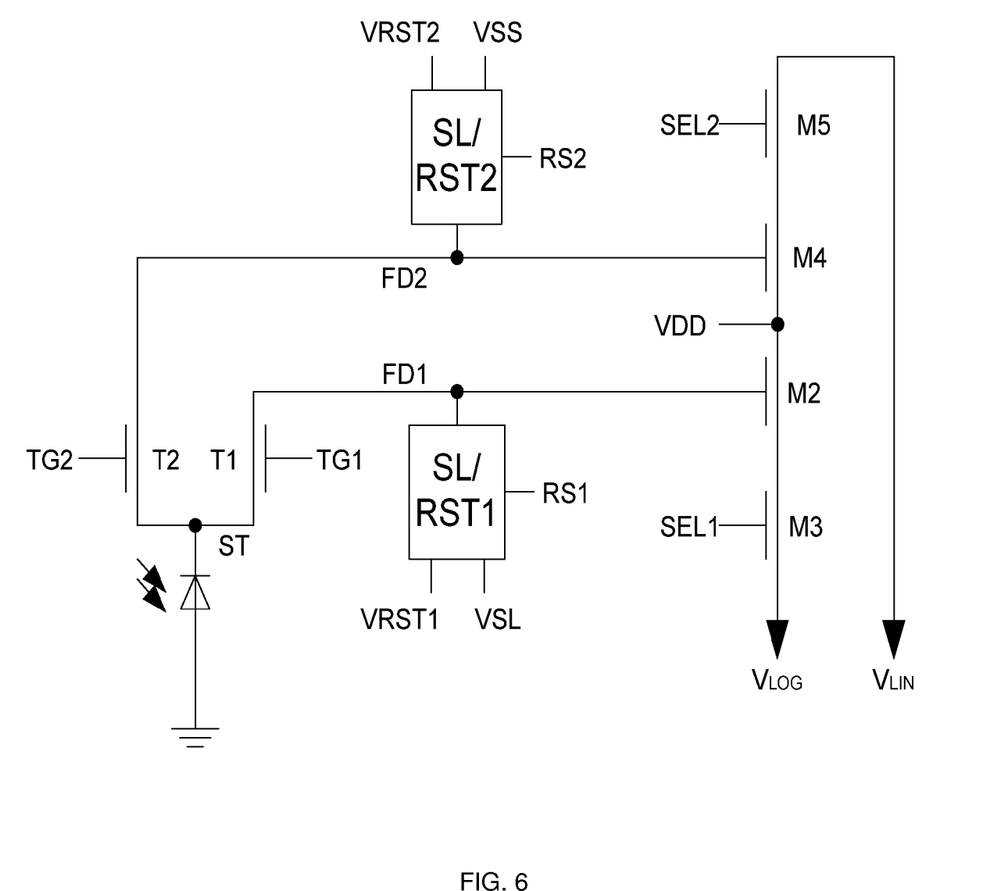
FIG. 6 shows a pixel without shutter transistors, but two output paths for high speed read-out, FIG. 7 schematically shows a basic pixel with sub-linear element and a shutter transistor.

FIG. 6 implements the pixel from FIG. 7 using two read-out paths for high speed operation. SH is not necessary since VPRS1 and VPRS2 are stored on different nodes. The reset transistor and the sub-linear element are contained in the block labeled SL/RST1 and SL/RST2 and can be implemented using any of the three possibilities drawn in FIG. 2: the right most version uses the reset transistor also as the sub-linear element by controlling the voltage at RS accordingly.

FD1 holds the sub-linear part of the signal and FD2 the linear part. If two SL/RST blocks are used for symmetry, the SL element of SL/RST2 can be connected to the VSS.

Figure 5:
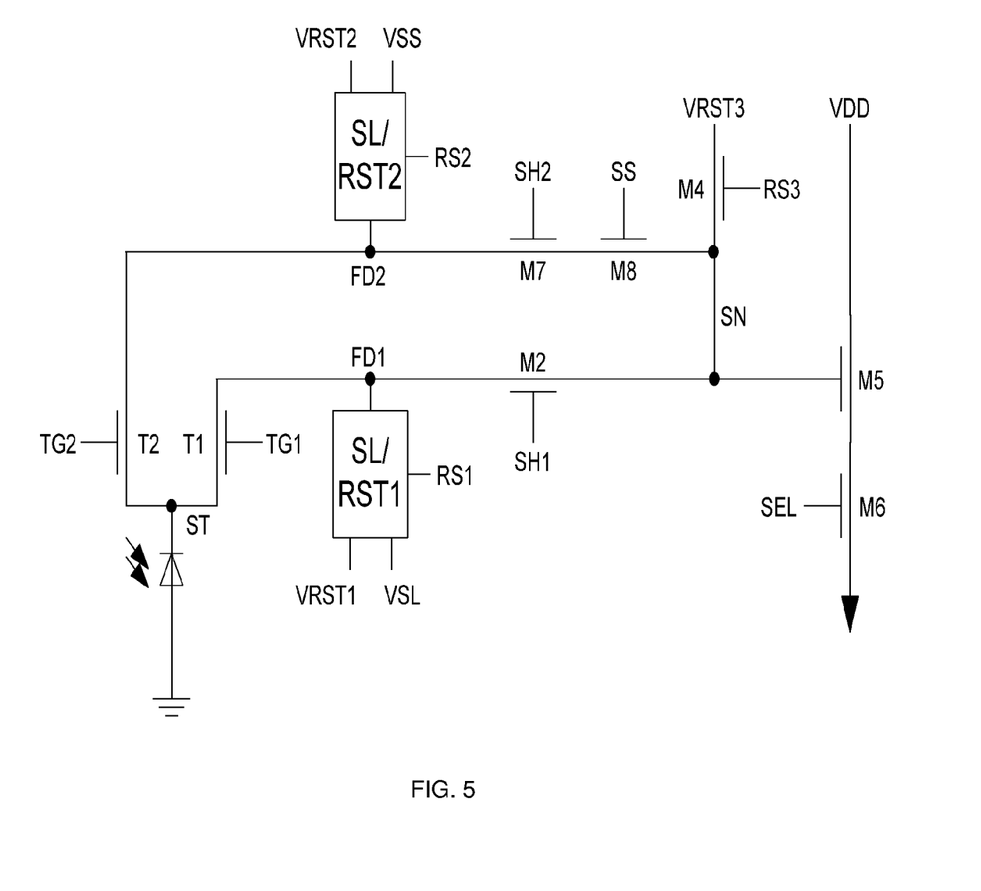

FIG. 5 shows a pixel that keeps FD1 and FD2 separately but uses one output path. Furthermore SH1, SH2 and SS are added to implement a global shutter functionality. The column amplifier has to support two modes: VPSL-VPRS1 and VPRS1-VLIN because the order at which the pixel values are output is different for the sub-linear and the linear part.

Figure 4:
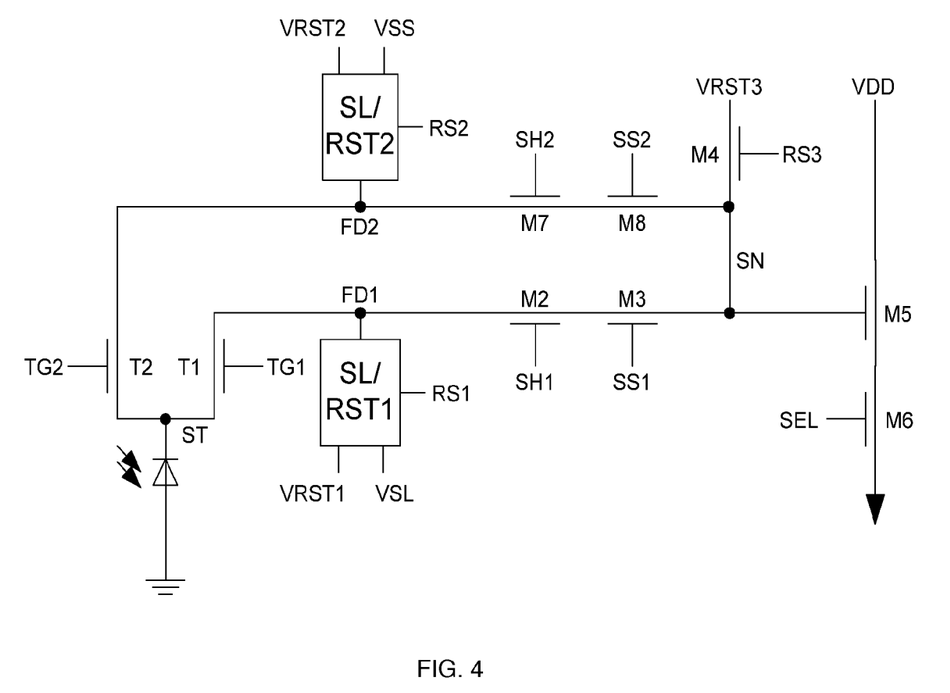

The pixel in FIG. 4 is identical to the one of FIG. 5 except for the fact that sampling switches are used in both paths: this allows the same processing sequence in the column amplifier, that is to say a difference between a reset voltage and a signal level.

Figure 3:
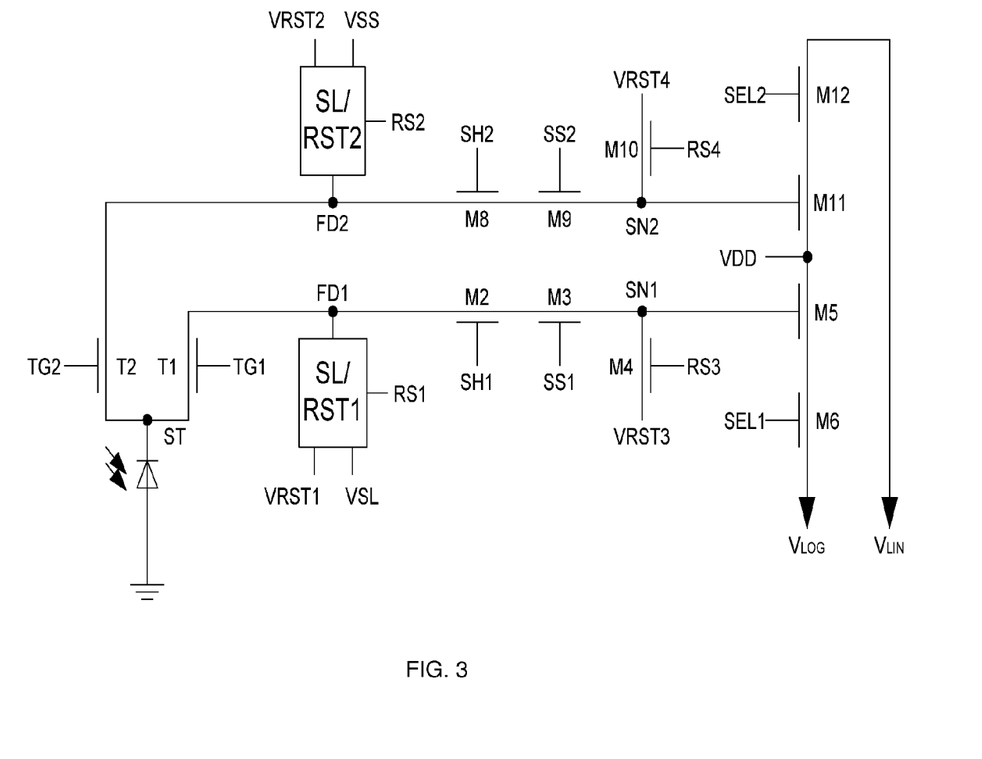
FIG. 3 schematically shows the pixel from FIG. 1 without a global reset at the PPD node, FIG. 4 schematically illustrates a modification of the pixel in FIG. 3, where only one output path is used, FIG. 5 schematically shows the pixel from FIG. 4 without a sampling transistor in the sub-linear path.

The pixel in FIG. 3 implements a high speed pixel with global shutter and integrate-while-read capability. In contrast to FIG.1, the reset of FD1 and FD2 are executed with SL/RST1 and SL/RST2 instead of TO. The advantage is a faster reset sequence at the expense of more complexity within the pixel.

FIG. 1 shows a high speed, high dynamic range, low noise pixel that allows integrate-while-read operation. The sequence of operation is detailed below:

Global reset: TG0 is pulled high to empty all charges from the storage node ST of the PPD. RS3, RS4, SSx and SHx are also high to reset all internal nodes, wherein x ∊[1,2].

Exposure: accumulation of charges starts as soon as TG0 is de-activated and stops when SH1 and TG2 were activated.

Read-out: the sub-linear value is sampled using SH1. The linear value is sampled by putting TG2 high and toggling SH2 as soon as SH1 is deactivated. Now both values are stored and TG0 can be activating to restart the next exposure immediately. SEL is now activated and two reset values can be sampled by the column amplifiers. Then SS1 and SS2 transfer the pixel values to SN1 and SN2 respectively where they are buffered into the column bus. As soon as the column amplifiers stored the difference to the preceding reset value the pixel is ready to be reset.

Line reset: SEL is put low, RS3, RS4, SSx and SHx are going high to reset FDx and SNx as well as the intermediate nodes of the pixel. The next line of pixels in the array can be processed.

While the invention has been described with respect to a limited number of embodiments, these should not be construed as limitations on the scope of the invention, but rather as exemplifications of some of the embodiments. Those skilled in the art will envision other possible variations, modifications, and programs that are also within the scope of the invention. Accordingly, the scope of the invention should not be limited by what has thus far been described.

The invention claimed is:

1. A imaging device comprising:
   a photo sensor for generating photoinduced charge carriers, wherein said photo sensor is implemented by one of the following: a pinned photo diode (PPD), a buried photo diode, and a charge-coupled device (CCD),
   at least one transfer gate to release said charge into at least one respective floating diffusion node,
   a sub-linear element connected to said at least one floating diffusion node,
   a sub-linear voltage source for which the voltage drop depends in a sub-linear fashion on a current through photo sensor, and
   a first transistor connected between said floating diffusion and a sense node, and a second transistor between said sense node and a reset voltage,
   a third transistor,
   a fourth transistor,
   a source follower and a select transistor for measuring a measured voltage indicative of a voltage at said floating diffusion node,
   a control circuitry adapted to run at least one measuring cycle, wherein each measuring cycle comprises the following three phases:
   a) in a first phase, said control circuit issues a first reset command to said second transistor and toggles a shutter signal high, and transfer gate between a spill-over voltage and a charge transfer voltage to completely empty the pinned photodiode storage node of the PPD,
   b) in a second phase, a select signal of a pixel is controlled to measure a pixel's first reset voltage, then puts the shutter signal high to measure a the pixel's sub-linear signal voltage, and issues a second reset command based on the measurement, and
   c) in a third phase, said control circuit controls the pixel select signal to measure the pixel's second reset voltage, then puts the shutter signal high and operates the transfer gate to generate the pixel's fourth linear signal voltage.

2. The photo sensor of claim 1, wherein said first transistor is a shutter transistor.

3. The photo sensor of claim 1 further comprising:
   a first sub-linear reset element connected between first floating diffusion node, said sub-linear voltage source and the first reset voltage, for which a voltage drop depend in a sub-linear fashion on a current through said photo sensor, and
   a second sub-linear reset element connected between a second floating diffusion node, a VSS and a second reset voltage.

4. The photo sensor of claim 2 wherein said second sub-linear reset element is a reset transistor.

5. The photo sensor of claim 1 further comprising a fifth transistor, wherein said second and third transistor measures a first voltage on said first floating diffusion node, and said fourth and said fifth transistor measure a second voltage on said second floating diffusion node.

6. The photo sensor of claim 1, further comprising a sixth, seventh and eighth transistor,
   wherein both said seventh and eighth transistor are operatively coupled between said second floating diffusion node and said sense node,
   wherein said second and third transistor is operatively coupled with said first floating diffusion node and said sense node,
   wherein said fourth transistor is operatively coupled with the reset volt-age and said sense node,
   thus enabling said source follower and said select transistor to measure a measured the voltage at said sense node.

7. The photo sensor of claim 1, further comprising a ninth transistor between said second floating diffusion node,
   a tenth transistor,
   an eleventh transistor,
   an twelfth transistor,
   a first sense node,
   a second sense node,
   wherein said third transistor is operatively coupled between said first floating diffusion node and said first sense node, wherein said eighth and said ninth transistor are between said second floating diffusion node and said second sense node, wherein said fourth transistor is operatively coupled between said first sense node and a third reset voltage,
   wherein said tenth transistor is operatively coupled between said second sense node and a fourth reset voltage respectively,
   wherein said fifth and sixth transistors measure a voltage indicative of a voltage at said first sense node, and
   wherein an eleventh and twelfth transistor measure a voltage at said second sense node.

8. The photo sensor of claim 7, further comprising a third transfer gate between a pinned photodiode storage node and fifth reset voltage.

9. The photo sensor of any claim 1, wherein said sub-linear element is either one of the following: a diode and a diode connected transistor.

10. The photo sensor of claim 1, wherein said sub-linear reset element comprises either one of the following:
    a) a sub-linear element and a reset transistor wherein the gate voltage has two different values, 0 and VDD; and
    b) a transistor wherein the gate voltage can have three state: 0, VDD and said sub-linear voltage source.

11. A photo sensor array comprising a plurality of photo sensors of claim 1.

* * * * *